United States Patent
Takeuchi et al.

(10) Patent No.: US 8,251,197 B2
(45) Date of Patent: Aug. 28, 2012

(54) BANKNOTE DEPOSIT MACHINE, PROCESSING SYSTEM AND METHOD

(75) Inventors: Hisashi Takeuchi, Hyogo-Ken (JP); Yoshiaki Ikuta, Hyogo-Ken (JP); Masao Sakamoto, Hyogo-Ken (JP); Hirokazu Goto, Hyogo-Ken (JP); Masaru Hayasako, Osaka-Fu (JP)

(73) Assignee: Glory Kogyo Kabushiki Kaisha (JP)

( * ) Notice: Subject to any disclaimer, the term of this patent is extended or adjusted under 35 U.S.C. 154(b) by 167 days.

(21) Appl. No.: 12/727,355

(22) Filed: Mar. 19, 2010

(65) Prior Publication Data

US 2010/0174403 A1 Jul. 8, 2010

Related U.S. Application Data

(62) Division of application No. 10/821,736, filed on Apr. 9, 2004, now Pat. No. 7,694,797.

(30) Foreign Application Priority Data

Apr. 9, 2003 (JP) .................................. 2003-105330

(51) Int. Cl.
*G07F 7/04* (2006.01)
(52) U.S. Cl. ........................................ 194/206; 209/534
(58) Field of Classification Search .................. 194/206, 194/207, 205, 302; 209/534; 235/379; 902/8, 902/9, 38
See application file for complete search history.

(56) References Cited

U.S. PATENT DOCUMENTS

| | | | |
|---|---|---|---|
| 6,981,637 B2* | 1/2006 | Nagayoshi et al. | ........... 235/379 |
| 2002/0011431 A1 | 1/2002 | Graef et al. | |
| 2002/0033359 A1 | 3/2002 | Graef et al. | |
| 2002/0085745 A1 | 7/2002 | Jones et al. | |
| 2003/0047601 A1* | 3/2003 | Nomiyama et al. | ........... 235/381 |
| 2003/0059098 A1 | 3/2003 | Jones et al. | |
| 2004/0118657 A1* | 6/2004 | Kallin et al. | .................. 194/207 |

FOREIGN PATENT DOCUMENTS

| | | |
|---|---|---|
| EP | 1199682 A2 | 4/2002 |
| GB | 2225662 A | 6/1990 |
| WO | 00/23952 | 4/2000 |

* cited by examiner

*Primary Examiner* — Mark Beauchaine
(74) *Attorney, Agent, or Firm* — Baker & Hostetler LLP

(57) ABSTRACT

A printed note deposit machine, comprises: a user recognition unit identifying a user with an authenticated person; an inlet unit serving as a receiving teller in which printed notes are deposited; a dispensing unit receiving printed notes deposited in the inlet unit to dispense them in sequence; an identifying unit classifying the dispensed printed notes into four categories of authenticated notes, counterfeit notes, unidentifiable notes, and rejected notes, and identified them with the four categories; a temporary money holder temporarily storing the authenticated, counterfeit, and unidentified notes but the rejected ones therein; a plurality of storage cells storing the printed notes after they are temporarily stored in the previous stage; and a rejection unit accumulating the printed notes identified with the rejected notes by the identifying unit to return them to the user. A printed note deposit system, comprises: a plurality of the printed note deposit machines; a database apparatus installed in a central office and receiving transaction data from the memory of each of the printed note deposit machines to accumulate the transaction data; and a trace unit matching the transaction data accumulated in the database apparatus with transaction data on the detected counterfeit or unidentified notes to track down a user of the unauthenticated notes.

8 Claims, 9 Drawing Sheets

SINGLE TRANSACTION DATA

| CONTENTS | DESCRIPTIONS |
|---|---|
| MACHINE NO. | |
| TRANSACTION NO. | |
| TRANSACTION START TIME | SEC/MIN/HOUR/MON/YEAR |
| TRANSACTION END TIME | SEC/MIN/HOUR/MON/YEAR |
| CUSTOMER INFORMATION | ACCOUNTING NUMBER, FINGER PRINT INFORMATION, ETC. |
| COUNT INFORMATION | SUBTOTAL AND AMOUNT OF BANK NOTES OF EACH DENOMINATION, TOTAL AND AMOUNT OF MIXED BANK NOTES, ETC |
| CURRENCY INFO | DATA OF THE PAPER CURRENCIES AS MANY AS HANDLED IN BATCH |
| CURRENCY INFO | DATA OF THE PAPER CURRENCIES AS MANY AS HANDLED IN NEXT BATCH |
| ........ | .................... |
| CURRENCY INFO | DATA OF THE PAPER CURRENCIES AS MANY AS HANDLED IN LAST BATCH |

FIG. 10

INFORMATION ON AN INDIVIDUAL BANK NOTE

| CONTENTS | DESCRIPTIONS |
|---|---|
| ID# OF NOTE | IDENTIFICATION NUMBER OF THE NOTE |
| ID RESULT | CATEGORY CODE |
| | COUNTRY CODE |
| | DENOMINATION CODE |
| | ORIENTATION CODE |
| | SERIAL NUMBER |
| | CRITERIA OF DETERMINING THE DENOMINATION |
| DATA ON EACH SENSOR | CATEGORY OF RED FROM TRANSMISSION COLOR SENSOR 1 |
| | CATEGORY OF INFRARED FROM TRANSMISSION COLOR SENSOR 1 |
| | CATEGORY OF BLUE FROM TRANSMISSION COLOR SENSOR 2 |
| | CATEGORY OF INFRARED FROM TRANSMISSION COLOR SENSOR 2 |
| | CATEGORY FROM REFLECTION INFRARED SENSOR 1 |
| | CATEGORY FROM REFLECTION INFRARED SENSOR 2 |
| | CATEGORY FROM FLUORESCENCE SENSOR |
| | CATEGORY FROM MAGNETIC SENSOR |
| | CATEGORY FROM THREAD SENSOR |
| DETAILED DATA OF NOTE | PAPER CURRENCY IMAGE INFORMATION |

FIG. 12

BANKNOTE DEPOSIT MACHINE, PROCESSING SYSTEM AND METHOD

CROSS REFERENCE TO RELATED APPLICATION

The present invention is a Divisional application of U.S. Ser. No. 10/821,736

This application is based upon and claims the benefit of priority from the prior Japanese Patent Application No. 2003-105330, filed on Apr. 9, 2003; the entire contents of which are incorporated herein by reference.

BACKGROUND OF THE INVENTION

The present invention relates to printed note processing machine and system that performs a receiving teller process for deposit of printed notes including currency bills.

In depositing money in a bank or its alternative money exchange system, it has typically been conducted that deposited currency bills are all identified with and categorized into authenticated notes (including damaged notes), unauthenticated counterfeit notes, unidentifiable notes, and rejected notes due to an overlap of more than one notes or a canted posture of notes.

It is also very common that any printed note recognized as the counterfeit note, the unidentifiable note, or the rejected note but the authenticated note is returned as the unacceptable to a customer.

It is a crime to use counterfeit notes, and when currency bills used for payment or deposit in a bank are recognized as counterfeit notes, the currency bills must be cautiously examined if they truly are counterfeited notes. The counterfeit and unidentifiable notes might be a real proof in judging that the suspected of counterfeiting is guilty.

In the state of the art, proposed and well known is a money order teller machine capable of examining deposited paper notes to give a warning if any of the notes is recognized as highly suspected of being counterfeited (see Japanese Patent No. 3,368,906).

Such a prior art printed note deposit machine immediately returns the counterfeit and unidentifiable notes without a temporary capture, and hence, an opportunity to identify them and then a proof of a crime are lost.

SUMMARY OF THE INVENTION

The present invention is made to overcome the aforementioned disadvantages in the prior art, and accordingly, it is an object of the present invention to provide a printed note deposit machine and system that ensure a detection of counterfeit notes and a succeeding capture of them for a real proof of a crime.

The printed note deposit machine in accordance with the present invention is comprised of a user recognition unit identifying a user with an authenticated person, an inlet unit serving as a receiving teller in which printed notes are deposited, a dispensing unit receiving printed notes deposited in the inlet unit for dispensing them in sequence, an identifying unit classifying the dispensed printed notes into four categories of authenticated notes, counterfeit notes, unidentifiable notes, and rejected notes and identified them with the four categories, a temporary money holder temporarily storing the authenticated, counterfeit, and unidentified notes but the rejected ones, a plurality of storage cells storing the printed notes after they are temporarily stored in the previous stage, and a rejection unit accumulating the printed notes identified with the rejected notes by the identifying unit to return them to the user.

In this machine, after a customer is authenticated by a bank card and/or a finger print he or she has, a plurality of ID sensors each producing four-category information are used to classify deposited currency bills into appropriate one of the categories, and the classification result is stored in a memory for every note of the deposited currency bills.

As a consequence, a fully cautious examination can be conducted for every note of the deposited currency bills to determined if it is counterfeit or not, and thus, a crime can be uncovered and the suspected can be inquired about how he or she has come to use the counterfeited notes. To attain such features, operating specifications may simply be changed without addition nor modification of the mechanisms, and such a minor revision can be applied to any machine that has already been commercially available.

A printed note deposit system in accordance with the present invention is comprised of a plurality of the aforementioned printed note deposit machines, a database apparatus built in a center office receiving transaction data stored in the memory of each of the printed note deposit machines to cumulatively store the transaction data, and a trace unit matching the transaction data stored in the database apparatus with transaction data on the suspected counterfeit or unidentifiable note to track down a user of the unauthenticated bank notes.

In this system, since the identification data of the deposited currency bills and the data on a customer (user) who has made a deposit of the money are correlatedly organized in database to carry out the matching, it is possible to trace an suspected use of the counterfeit or unidentifiable note back to a particular person who has deposited it, and in this manner, a detection of the counterfeit notes and a capture of a real proof of using such counterfeited note can be facilitated.

BRIEF DESCRIPTION OF THE DRAWINGS

FIG. 10 is a diagram showing details of transaction data;

FIG. 12 is a list providing details of sample information on a currency bill read by the exemplary currency bill deposit machine.

DESCRIPTION OF THE INVENTION

Embodiments of the present invention will now be described in detail with reference to the accompanying drawings. An embodiment of a currency bill deposit machine will be detailed only by way of example below.

Figure 1:
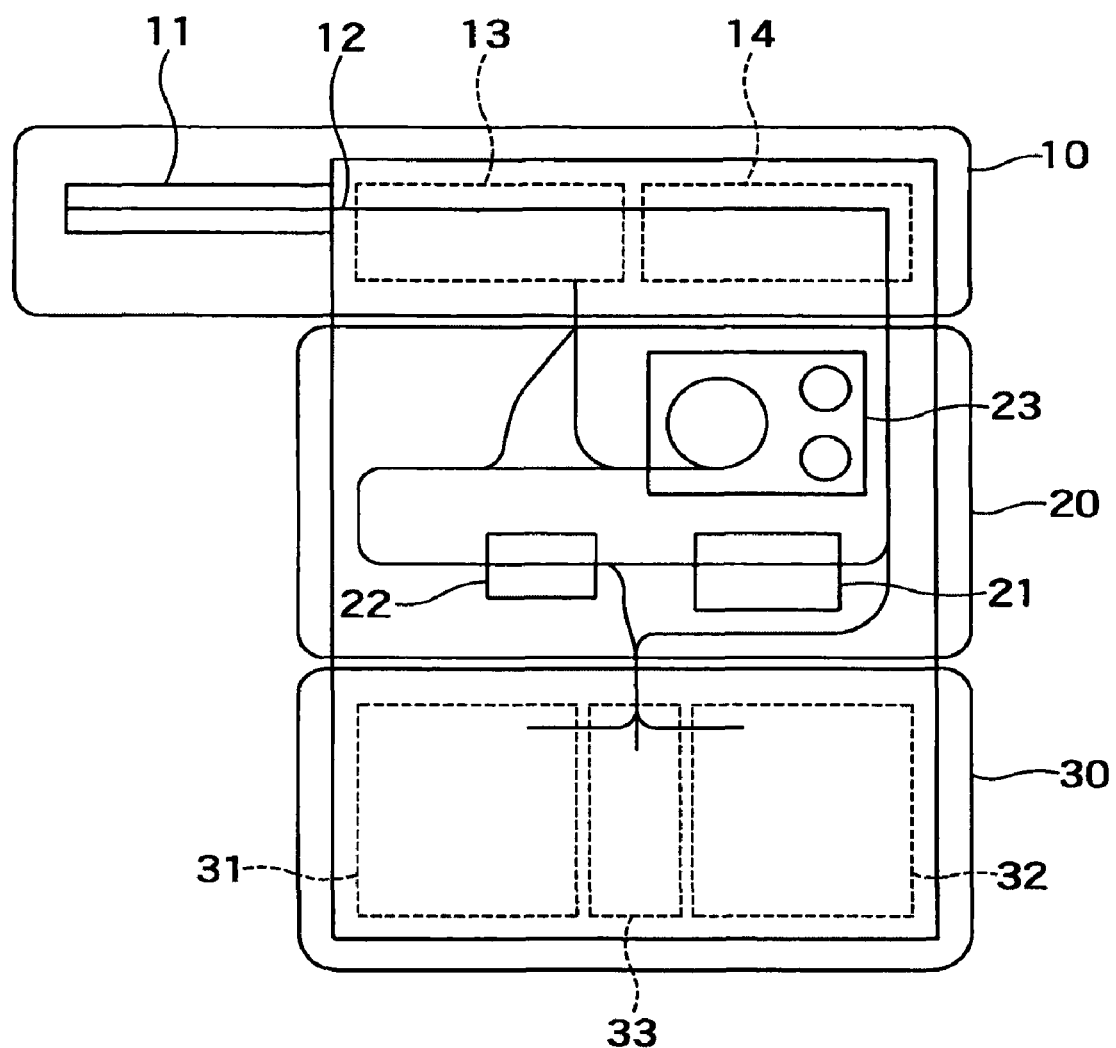
FIG. 1 is a schematic diagram showing a structure of an exemplary currency bill deposit machine according to the present invention.

FIG. 1 is a schematic diagram showing a structure of an exemplary currency bill deposit machine according to the present invention.

As can be seen in FIG. 1, the uppermost portion of a stack structure is named receiving and paying teller unit 10 of which left end is a deposit unit (inlet unit) currency bills as many as fifty in number can be deposited where a note or a bunch of currency bills are, when deposited by a customer, detected by a photo sensor (not shown) and then transferred through a money chute 12 to a dispensing unit 14 at the right end of the unit 10. In the course of the chute 12, a rejection unit 13 is located in parallel with the chute and capable of storing rejected notes such as decrepit currency bills as many as one hundred in number, for example, and the rejection unit is linked with the chute by shunting a track in returning the rejected notes to the customer. The rejected notes, when accumulated in the rejection unit 13, are detected by the photo sensor (not shown), and the number of the currency bills to return at a time can be designated in a range from 10 to 100, for example, as desired.

The dispensing unit 14 has another photo sensor (not shown) detecting a batch of the currency bills chuted and accumulated therein. The dispensing unit 14 has a capacity of holding such currency bills of any amount as many as 100, for example, and the currencies deposited therein are let out, piece by piece, in sequence in response to a given command.

The middle portion of the stack in the currency bill deposit machine is referred to as transfer unit and denoted by reference numeral 20. The transfer unit 20 transfers the currency bills ejected on the piece-by-piece basis from the dispensing unit and then proceeds with succeeding steps on them as required in sub-units respectively located in position along its distribution stream, such as an ID unit 21 determining if the currency bills are authenticated or not, and decrepit or not, and a serial number reader unit 22 reading a serial number unique to each currency bill. The serial number reader unit 22 is available as an optional unit and is not necessarily included.

In this middle portion, a temporary money holder 23 is also provided to temporarily store the currency bills in response to the determination results from the ID unit 21. The temporary money holder 23 has a capacity of 100 mixed currencies in maximum number, for example, and a process setting can be varied by giving a designation of the maximum number ranging from 10 to 100 and a command of the full detection to an associated counter. The temporary money holder may work in a take-up style which lets the stored currency bills out in the reverse sequence to their incoming order, or alternatively, it may be in a stack type storage.

Information on each of the currency bills resulted from the processing in the ID unit 21, the serial number reader unit 22, and the sensor (not shown) contain those listed in FIG. 12 and described below:

(a) ID numbers of currency bills: Consecutive numbers given to all the currencies handled in one batch transaction;

(b) Identification results: Attributes unique to each of the currencies and obtained by the currency bill recognition process, including a category code (determined by the comprehensive examination of detections on each sensor), a country code, a denomination code, an orientation (front or reverse) code, a serial number, a denomination determination level (a criteria of determining the determination), and so forth;

(c) Sensor data: Identification results from each of the sensors respectively located in position, including a category of RED from a transmission color sensor 1, a category of INFRARED from the transmission color sensor 1, a category of BLUE from a transmission color sensor 2, a category of INFRARED from the transmission color sensor 2, a category from a reflection infrared sensor 1, a category from a reflection infrared sensor 2, a category from a fluorescent sensor, a category from a magnetic sensor, a category from a thread sensor, and the like; and (d) Detailed currency data: Image data on each of the currency bills.

Now, the structure of the currency bill deposit machine will be discussed again, and the lower portion of the stack in the machine is a storage unit 30. The storage unit 30 consists of a front cassette 31 collecting bank notes of different dominations separately or mixed bank notes together, a rear cassette 32, and a counterfeit note storage or a capture bin 33 storing counterfeit notes and unidentifiable notes. The front and rear cassettes respectively have a capacity of 1500 notes at a time, for example, and they are respectively featured with a near-full detection by a photo interrupter (not shown) and a cassette-full detection of detecting 300 more bank notes added after the near-full detection.

The counterfeit note storage 33 has a maximum capacity of 50 bank notes, for example, and it also is featured with detection of the absence or the presence of currency bills by a photo sensor (not shown), a near-full (e.g., 40 bank notes) detection by a counter, and a full (e.g., 50 bank notes) detection similarly by the counter.

There may be two or more of the front cassettes and the capture bins if desired, and the counterfeit notes and the unidentifiable notes may be stored separately.

Figure 2:
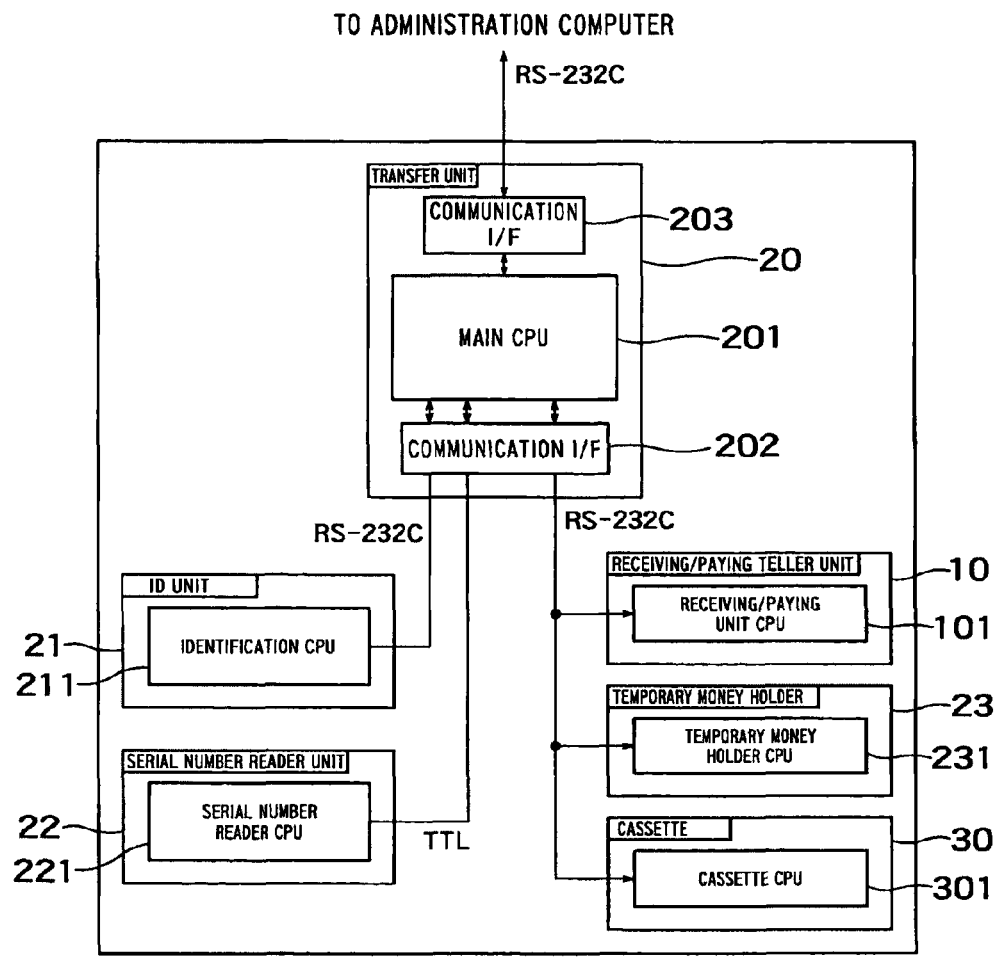
FIG. 2 is a block diagram illustrating a control system and associated data transmission in the exemplary currency bill deposit machine according to the present invention.

FIG. 2 is a block diagram illustrating a control system and associated data transmission in the currency bill deposit machine.

The transfer unit has a main CPU built in to control the whole machine. The main CPU is a microcomputer of relatively high speed processing. The receiving/paying teller unit 10, the ID unit 21, the serial number reader unit 22, the temporary money holder 23, and the cassette 30 respectively have a receiving/paying teller unit CPU 101, an ID unit CPU 211, a serial number reader unit CPU 221, a temporary money holder CPU 231, and a cassette CPU 301, which undertake part or all of jobs for control and data transmission allocated to them. Each of the CPUs is a single chip microcomputer which may be of lower speed and lower cost compared with the main CPU.

Each of the CPUs performs not only the control of the associated unit but does the data transmission to and from the main CPU. In such a case, the ID unit CPU 211 sends ID data via a communication interface to the main CPU while the serial number reader unit CPU 221 transfers serial number data via the communication interface to the main CPU. The receiving/paying teller unit CPU 101, the temporary money holder CPU 231, the cassette CPU 301, and the main CPU send and receive control commands to and from one another via the communication interface. Counterfeit identification data and counterfeit processing records from the main CPU are sent to an external administration computer, which is in communication with transmission system via a communication interface 203 to give instructions and data.

Figure 3:
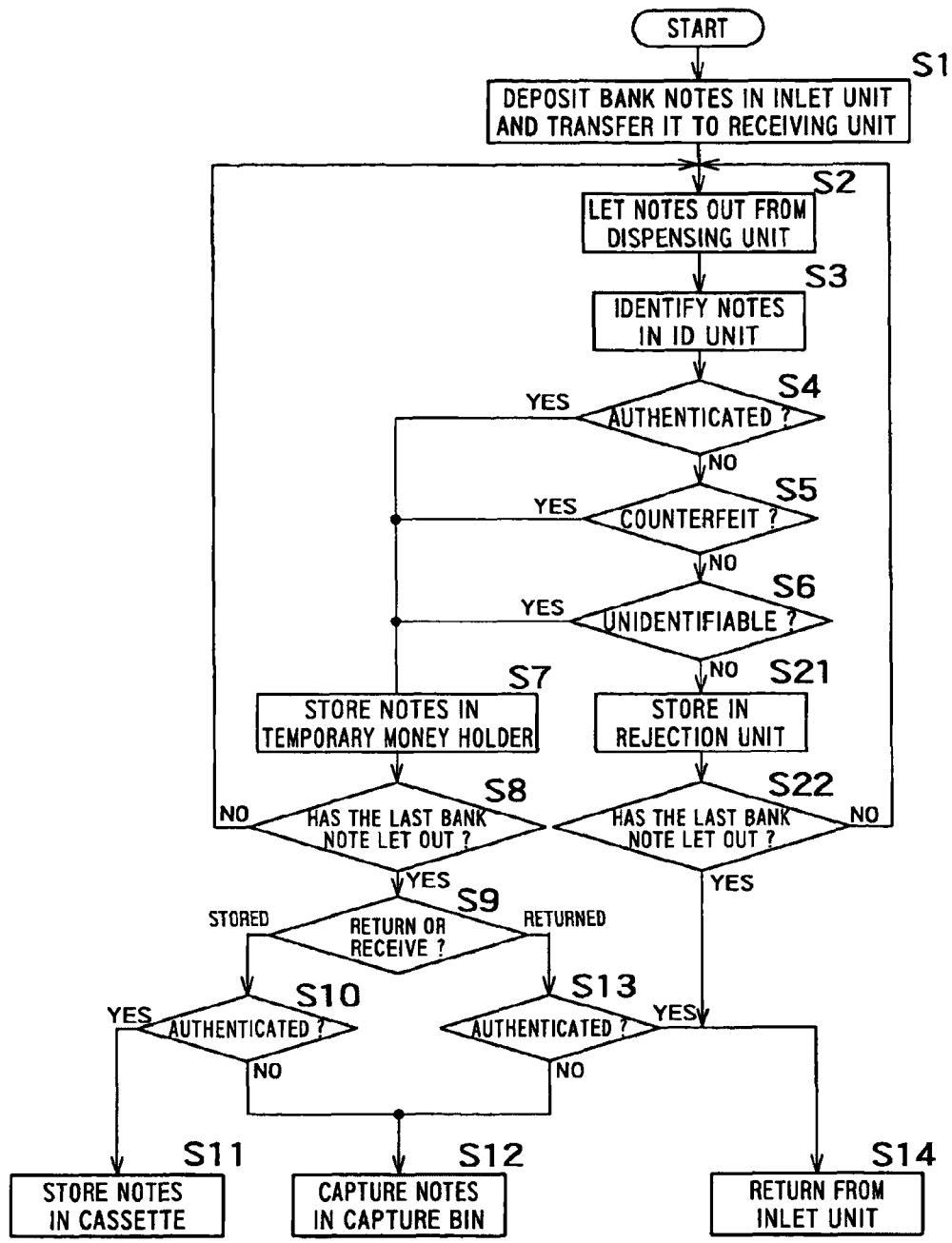
FIG. 3 is a flow chart schematically showing an operation of the exemplary currency bill deposit machine according to the present invention.

An operation of the currency bill deposit machine will now be described with reference to FIGS. 3 to 9. FIG. 3 is a flow chart schematically illustrating the operation of the machine, and FIGS. 4 to 9 are diagrams illustrating the operation as in the machine structure depicted in FIG. 1.

When a banking card is inserted in the machine by a customer, first a customer information is read, and then, a customer's order to deposit money in his or her account is processed. In this point, a fingerprint of the customer may be taken to add to or make reference to the customer information.

Figure 4:
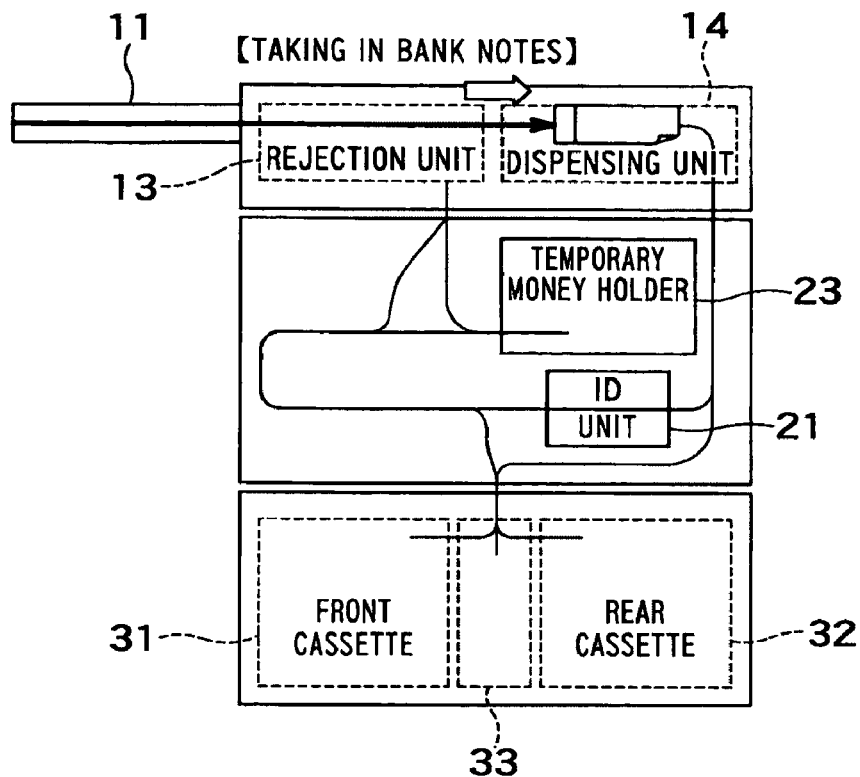
FIG. 4 is a view depicting a concept of taking currency bills in the exemplary currency bill deposit machine according to the present invention.

Once the deposit process is started, the machine receives an enable signal from the administration computer and clears various count data to keep a shutter of the inlet unit 11 open on standby till money is deposited. When deposit of a bunch of currency bills in the inlet unit 11 is detected and an entry unit (not shown) is used to give an instruction to start counting, the shutter is closed to chute the currency bills from the inlet unit 11 to the dispensing unit 14 as depicted in FIG. 4 (Step S1).

Figure 5:
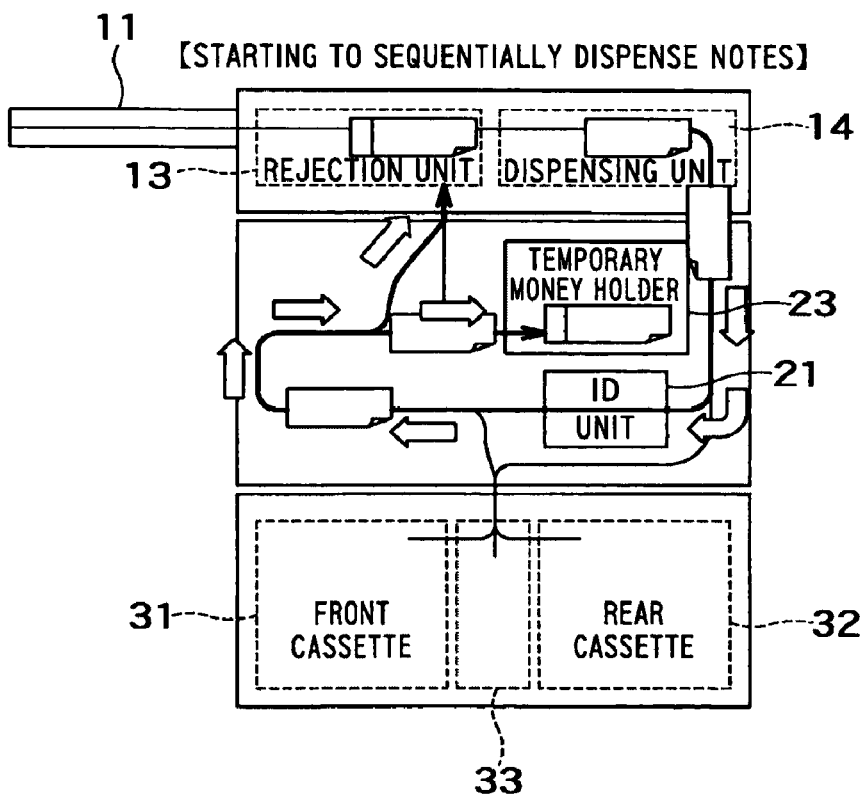
FIG. 5 is a view depicting a concept of dispensing and counting the currency bills in the exemplary currency bill deposit machine according to the present invention.

Then, as shown in FIG. 5, the dispensing unit 14 lets the deposited currency bills out piece by piece (Step S2). The currency bills let out into the ID unit 21 are counted, and their respective fraudulentness and denomination are determined (Step 3) to identify with authenticated notes, counterfeit notes, unidentifiable notes, and rejected notes, respectively. If recognized as authenticated (Step S4), counterfeit (Step S5), or unidentified (Step S6), they are temporarily held in the temporary money holder (step S7). The temporarily trapped ones have their respective ID data stored sequentially as in FIG. 12.

If recognized as not authenticated, not counterfeit, and not unidentified, they are identified with rejected notes due to an overlap of more than one notes or a canted posture of notes and chuted through a shunted track to the rejection unit 13 (Step S21). Such a classifying step is repeated till the dispensing unit 14 ejects the last currency (Steps S8 and S22).

Figure 6:
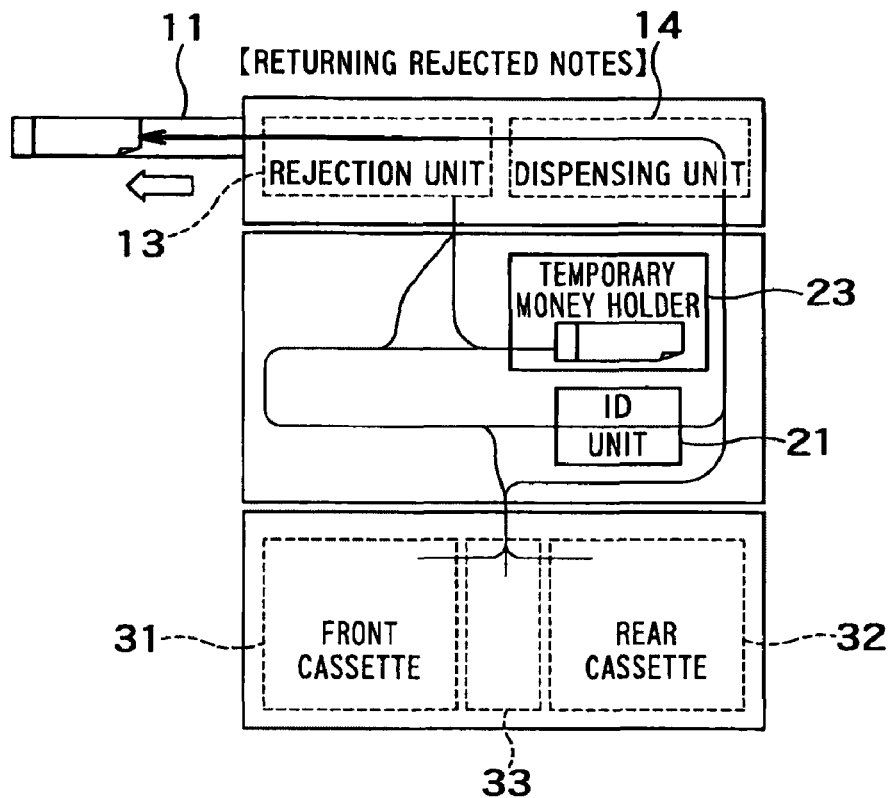
FIG. 6 is a view depicting a concept of returning a rejected note in the exemplary currency bill deposit machine according to the present invention.

When the dispensing unit 14 is completely empty, the rejected notes once stored in the rejection unit 13 are sent to the inlet unit and returned to the customer, as shown in FIG. 6.

Then, after the machine receives a disable signal from the administration computer of hierarchically superior order and closes the shutter, the currency bills temporarily stored in the temporary money holder 23 are handled, that is, they are either received or returned selectively (Step S9).

Figure 7:
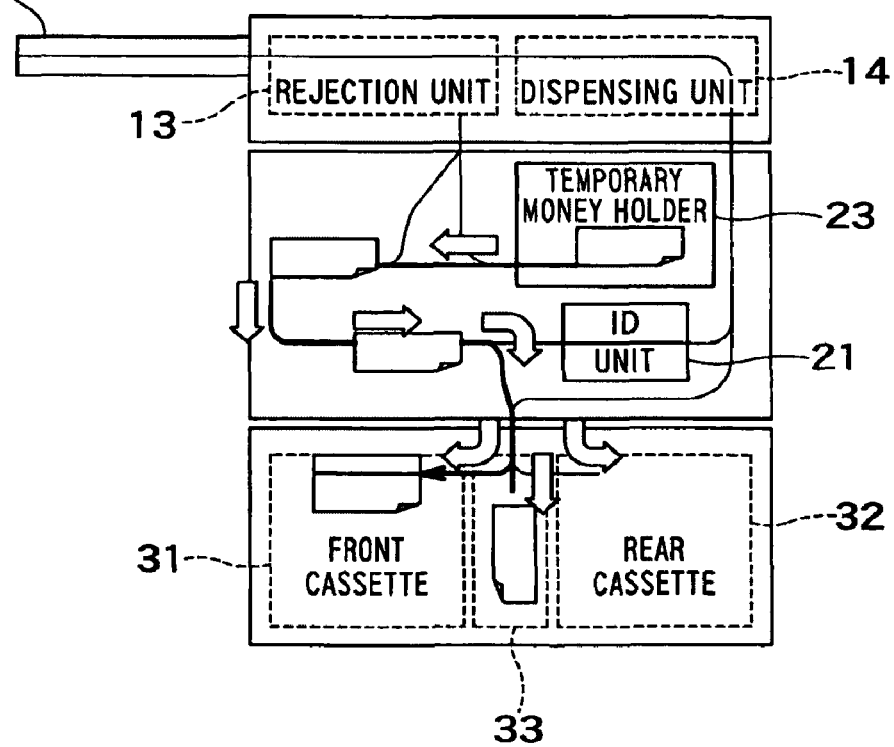
FIG. 7 is a view depicting a concept of sending some notes from a temporary money holder to a money storage in the exemplary currency bill deposit machine according to the present invention.

FIG. 7 illustrates a case of the reception (when determined to receive the currency bill at Step S9) where the currency bill from the temporary money holder is stored in the cassettes if it is authenticated (Steps S10 and S11), or otherwise, if either counterfeit or unidentified, they are seized in the capture bin 33 (Steps S10 and S12). In the former case, the currency bills of different denominations may separately stored in the front and rear cassette, or the mixed currencies may first be stored in the front cassette and then in the rear cassette after the front cassette is full, regardless of their denominations.

When received, the currency bills have their respective serial numbers read and added to the identification data to store for an individual currency if the machine optionally includes the serial number reader unit. Especially, it is desirable to save the serial numbers of the counterfeit and unidentifiable notes seized in the capture bin 33.

Figure 8:
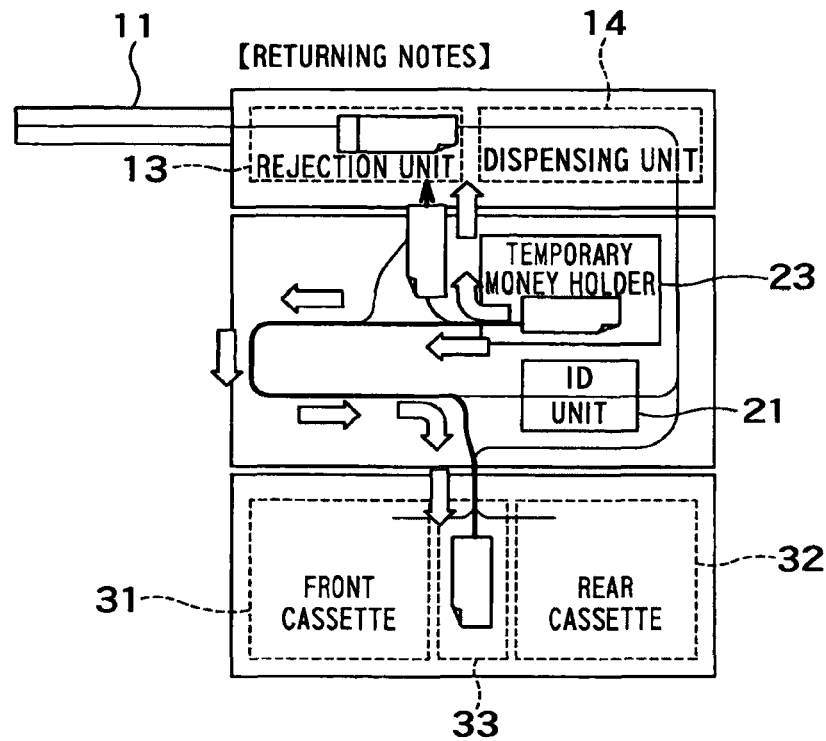
FIG. 8 is a view depicting a concept of returning and receiving some authenticated notes from the temporary money holder in the exemplary currency bill deposit machine according to the present invention.
Figure 9:
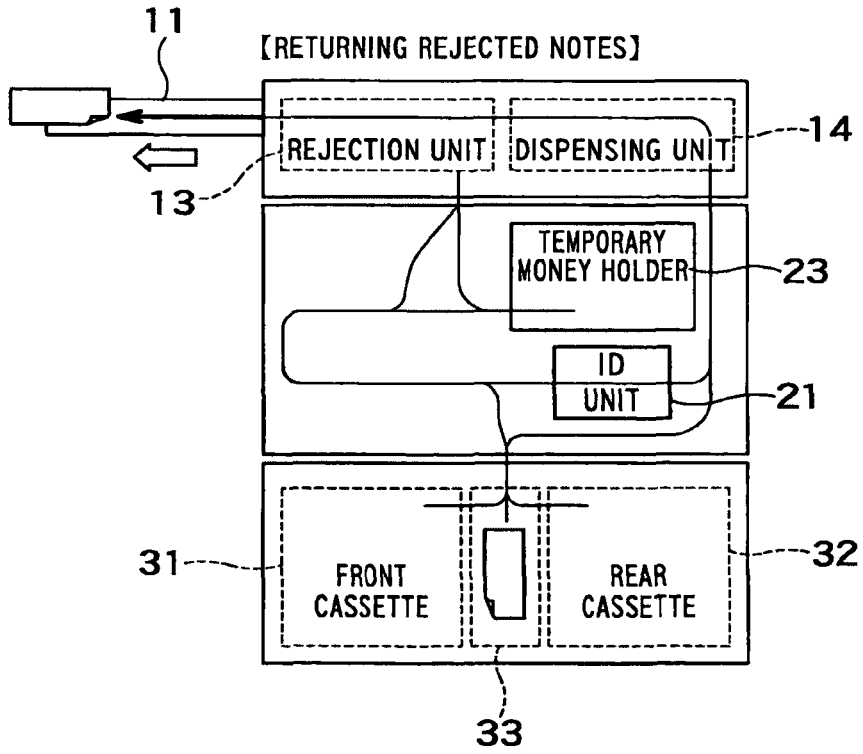
FIG. 9 is a view depicting a concept of returning some authenticated notes after transferring them to a rejection unit.

In returning the currency bills (as determined at Step S9), as shown in FIGS. 8 and 9, the authenticated notes are, after stored in the rejection unit, returned from the inlet unit to the customer (Steps S13 and S14) while the counterfeit or unidentified notes are seized in the capture bin 33 (Steps S13 and S12).

The transaction after undergoing the processing as mentioned above is further processed to collect and store various transaction data in the administration computer.

Particulars of the transaction data are listed in FIG. 10 where a single transaction data contains a machine number, a transaction number (coded in combination of processing types such as deposit, payment, rejection/return, and the like with consecutive numbers of the jobs), a transaction starting time indicated by sec/min/hour/day/mon/year, a transaction completing time, a customer information containing a customer's account number and finger print, a count information containing a subtotal and amount of bank notes of each denomination, a total of the mixed bank notes, a total amount of all the money, and the like, a currency information on an individual bank note as detailed in FIG. 12, etc. The currency information contains the ID data of each bank note as mentioned above.

In this embodiment, the transaction data are made for each or each bunch of currency bills that are stored or returned, and alternatively, the transaction data may be created only for each or each bunch of counterfeit and/or unidentified notes.

In this way, the machine according to the present invention facilitates detecting a counterfeit note and tracking down a user of the unauthenticated bank note because it stores in memory the customer (user) information and the currency information such as ID data of each bank note in relation with each other. This process design will be described below.

Figure 11:
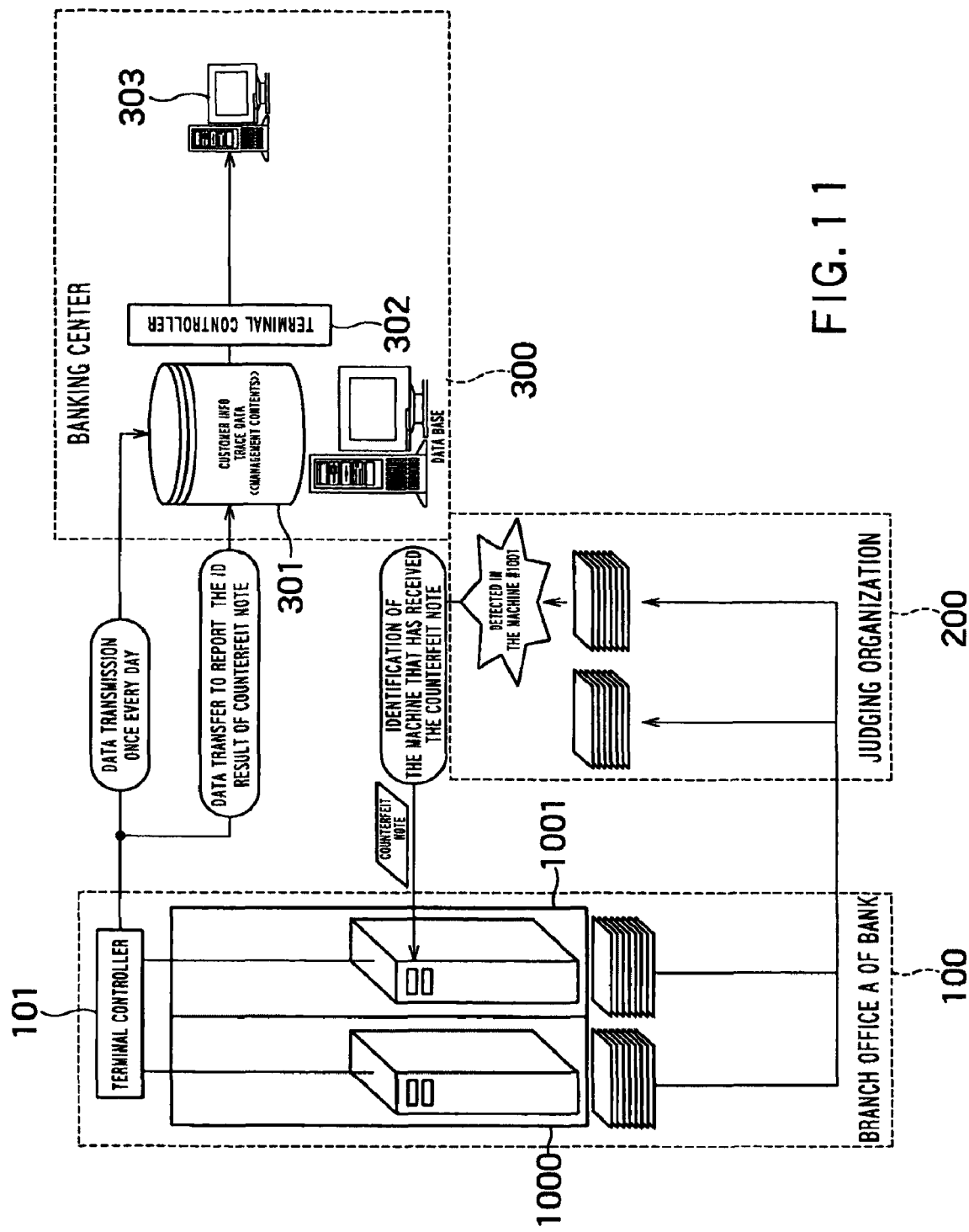
FIG. 11 is a typical diagram illustrating process steps beginning with a detection of a counterfeit note till tracking down the suspected user.

FIG. 11 is a typical diagram illustrating process steps beginning with a detection of a counterfeit note till tracking down the suspected user.

It is now assumed that a branch office A of a bank 100 installs two currency bill deposit machines 1000 and 1001 where several unauthenticated or unidentified notes have been accumulated in the capture bin.

The currency bill deposit machines 1000 and 1001 cumulatively store in memory transaction data containing the machine number, the currency data on each of the deposited bank notes, and the customer information, and transfer all the transaction data once everyday from a terminal controller 101 of the branch office A to a banking center 300 via communication line to store the received data in a customer information database 301 therein.

The suspected unauthorized or unidentified notes seized in the capture bin of the currency bill deposit machine are transferred to a judging organization 200 (e.g., the Europe Central Bank in Europe) to review if their fraudulentness is true. When the organization 200 judges that the notes are unauthentic, they are sent back to the branch office A of the bank 100 and deposited in the machine 1001 again to retrieve the ID data including the user's name as "X". Simultaneously, the currency information (transaction data) of the counterfeit notes are immediately transferred to the banking center 300 via the terminal controller 101 and stored in the database 301.

The database 301 is connected via the terminal controller 302 with a computer system serving as a trace tool 303 directly or indirectly through communication line to retrieve the transaction data associated with the machine 1001 from all the accumulated transaction data. After matching category data associated with the user X with those of each bank note obtained from each sensor, the customer information related to successfully matched results from the currency information is obtained to identify the suspected user of the counterfeit note with the authenticated customer. If two or more of the notes in the data meet the same matching reference during this matching procedure, additional matching is carried out by means of comparison of their image data with each suspected note to identify the note.

In FIG. 11, the trace tool 303 works along with the intervening terminal controller 302 installed in the banking center, but connecting the trace tool with the terminal controller 101 in the branch office A permits an immediate local detection. Alternatively, the trace tool 303 connected with the terminal controller 101 in the branch office A of the bank 100 may be used to match information in the database 301 with the transaction data in the name of the user X directly read out from the currency bill deposit machine.

Thus, in the aforementioned system, the customer information and the currency ID data of each bank note are correlatablly stored in memory, and any suspected counterfeit note is seized in the currency bill deposit machine without immediately returning it to a user unless the counterfeit note is matched with the data accumulated in the machine to assuredly determine its fraudulentness and identify the user with an authenticated customer, and as a consequence, a fully cautious examination can be facilitated in uncovering a crime of using counterfeit notes or counterfeiting imitation money, inquiring about how the suspected has come to use the counterfeited notes, and arresting a true criminal.

As has been described, since the currency bill deposit machine according to the present invention is capable of obtaining customer information, classifying deposited printed notes into four categories of authenticated notes, counterfeit notes, unidentifiable notes, and rejected notes, classifying data detected from each sensor in the same categories to store them in relation with the customer information, and temporarily storing the printed notes and then seizing counterfeit and unidentified notes in dedicated storage cells, the suspected bank notes can be reviewed cautiously and the suspected user can be easily tracked down.

Also, the currency bill deposit system according to the present invention incorporates the above-mentioned currency bill deposit machine to build database of printed note identification data and customer data (i.e., data on users of the machine) in relation with each other for the subsequent matching jobs, and hence, the suspected user of counterfeit or unidentified notes can be identified with an authenticated customer while a detection of the counterfeit notes and a capture of a real proof of using such counterfeited notes can be facilitated.

To attain improved features of the machine and system according to the present invention, operating specifications may simply be changed without addition nor modification of the mechanisms, and such a minor revision can be applied to any machine that has already been commercially available.

What is claimed is:

1. A banknote deposit machine, comprising:
an inlet unit in which banknotes are deposited;
an identifying unit classifying received banknotes into four categories of authenticated notes, counterfeit notes, unidentifiable notes, and rejected notes;
a temporary money holder for temporarily storing therein the banknotes classified as authenticated notes, counterfeit notes, and unidentified notes by the identifying unit; and
a plurality of storage cells provided inside the machine, respectively, for storing the banknotes which have been temporarily stored in the temporary money holder,
wherein the counterfeit and unidentified notes temporarily stored in the temporary money holder are stored in predetermined storage cells of the plurality of the storage cells, the authenticated notes temporarily stored in the temporary money holder are stored in any of the plurality of the storage cells other than the predetermined storage cells for the counterfeit and unidentified notes, and
in response to an instruction to return the deposited banknotes, the authenticated notes temporarily stored in the temporary money holder are returned to a user, and the counterfeit and the unidentified notes temporarily stored in the temporary money holder are stored in predetermined storage cells of the plurality of the storage cells.

2. The banknote deposit machine according to claim 1, further comprising a rejection unit for accumulating the banknotes which have been classified as rejected notes by the identifying unit.

3. The banknote deposit machine according to claim 1, wherein the temporary money holder is single in number.

4. The banknote deposit machine according to claim 1, wherein the identifying unit includes a serial number reader unit to read a serial number unique to each of the banknotes.

5. The banknote deposit machine according to claim 1, wherein the identifying unit includes a plurality of sensors which detect characteristics of the banknotes to classify the banknotes into the categories.

6. The banknote deposit machine according to claim 1, further comprising: a user identification unit identifying a user; and
a memory in which transaction data is stored, the data including at least one of the user information obtained by the user identification unit, the banknote information obtained by the identifying unit and information of the machine.

7. The banknote deposit machine according to claim 6, further comprising a communication unit transmitting the transaction data to an external apparatus.

8. A banknote processing system, comprising:
a plurality of the banknote deposit machines as defined in claim 6;
a database unit, installed in a central office, for receiving transaction data from each of the banknote deposit machines to accumulate the transaction data; and
a trace unit comparing the transaction data accumulated in the database unit and the transaction data on the detected counterfeit or unidentified notes.

* * * * *